United States Patent
Ota

(10) Patent No.: US 7,420,643 B2
(45) Date of Patent: Sep. 2, 2008

(54) ELECTRO-OPTICAL DEVICE, METHOD OF MANUFACTURING ELECTRO-OPTICAL DEVICE, AND ELECTRONIC APPARATUS

(75) Inventor: Naoshi Ota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 333 days.

(21) Appl. No.: 11/328,169

(22) Filed: Jan. 10, 2006

(65) Prior Publication Data

US 2006/0176437 A1    Aug. 10, 2006

(30) Foreign Application Priority Data

Feb. 7, 2005 (JP) ............................... 2005-030109

(51) Int. Cl.
*G02F 1/1345* (2006.01)
*G02F 1/13* (2006.01)

(52) U.S. Cl. .................. 349/149; 349/123; 349/126; 349/187

(58) Field of Classification Search .............. 349/123, 349/124, 126, 129, 132, 134, 138, 149, 187, 349/191

See application file for complete search history.

(56) References Cited

U.S. PATENT DOCUMENTS

| 5,498,762 | A | * | 3/1996 | Eguchi | ............... 428/1.2 |
| 5,764,318 | A | * | 6/1998 | Kurematsu et al. | ............. 349/5 |
| 5,835,248 | A | * | 11/1998 | Hanyu et al. | ............... 349/124 |
| 7,277,150 | B2 | * | 10/2007 | Murade | ............... 349/149 |

FOREIGN PATENT DOCUMENTS

| JP | 10-170941 | 6/1998 | |
| JP | A 10-232399 | 9/1998 | ............... 349/123 |
| JP | A-11-326936 | 11/1999 | |

* cited by examiner

*Primary Examiner*—Brian Healy
(74) *Attorney, Agent, or Firm*—Oliff & Berridge, PLC

(57) ABSTRACT

An electro-optical device includes a substrate; an external connecting terminal that is formed on the substrate; an insulating film that is formed on the external connecting terminal; an opening that is formed by removing a portion of the insulating film such that a portion of a surface of the external connecting terminal is exposed. The opening has an edge formed such that a portion extending in a rubbing direction has a curved shape when an alignment film formed on the insulating film is subjected to a rubbing process.

13 Claims, 7 Drawing Sheets

ELECTRO-OPTICAL DEVICE, METHOD OF MANUFACTURING ELECTRO-OPTICAL DEVICE, AND ELECTRONIC APPARATUS

BACKGROUND

1. Technical Field

The present invention relates to an electro-optical device, such as a liquid crystal device manufactured by a rubbing process for rubbing an alignment film, to a method of manufacturing an electro-optical device, and to an electronic apparatus having the liquid crystal device.

2. Related Art

In general, an electro-optical device has a structure in which liquid crystal is inserted between two substrates each of which is composed of a glass substrate, a quartz substrate or the like. In the electro-optical device, switching elements, such as thin film transistors (hereinafter, simply referred to as TFTs), are disposed in a matrix on one substrate, and a counter electrode is disposed on the other substrate. Image display can be performed by varying an optical characteristic of a liquid crystal layer interposed between the two substrates in accordance with an image signal.

A TFT substrate on which the TFTs are disposed and a counter substrate on which the counter electrode is disposed are formed so as to be separated from each other, and are bonded to each other with high precision after alignment films, which are formed on surfaces of the TFT substrate and the counter substrate coming into contact with the liquid crystal layer, are subjected to a rubbing process. A groove is generally formed in a region of the TFT substrate excluding an image display region in order that an external terminal electrode laminated on the TFT substrate or an electrode for electrically connecting the TFT substrate and the counter substrate is exposed to the outside.

In such an electro-optical device, various technologies for improving a display quality have been developed. For example, a technology has been disclosed for improving the display quality using the above-mentioned groove (for example, see JP-A-10-232399).

However, if an uneven shape, such as a groove, exists on the TFT substrate, since minute alignment irregularities may occur on the alignment film, a display quality may be deteriorated due to the alignment irregularities. Accordingly, various technologies have been examined in order to resolve the above-mentioned problems, but cannot resolve the problems. For example, when an edge of an opening formed on the surface of the TFT substrate has a portion extending in parallel to the rubbing direction, fabric disorder may occur in a cloth material of a rubbing roller using the portion extending in parallel to the rubbing direction as a boundary. In particular, when the rubbing process is performed using the rubbing roller where the fabric disorder occurs, striped alignment irregularities may occur on the alignment film. The inventors have concluded that the alignment irregularities occur due to the fabric disorder occurring in the cloth material of the rubbing roller, and the alignment irregularities lower the display quality of the liquid crystal device or the like.

SUMMARY

An advantage of some aspects of the invention is that it provides an electro-optical device such as a liquid crystal device capable of reducing striped alignment irregularities caused by fabric disorder occurring in a cloth material of a rubbing roller and achieving high definition display, a method of manufacturing the electro-optical device, and an electronic apparatus having the electro-optical device.

According to a first aspect of the invention, there is provided an electro-optical device that includes a substrate; an external connecting terminal that is formed on the substrate; an insulating film that is formed on the external connecting terminal; and an opening which is formed by removing a portion of the insulating film such that a portion of a surface of the external connecting terminal is exposed. The opening has an edge such that a portion extending in a rubbing direction has a curved shape when an alignment film formed on the insulating film is subjected to a rubbing process.

According to this aspect, a laminated structure, which includes an element such as a TFT, a conductive layer and an interlayer insulating film, is formed on the substrate, and the external connecting terminal is electrically connected to the TFT or the conductive layer in a direct manner or an indirect manner. The portion of the surface of the external connecting terminal is exposed by removing the portion of the insulating film formed on the external connecting terminal. That is, after forming the external connecting terminal on the substrate, the opening is formed by etching the insulating film formed on the external connecting terminal such that the portion of the surface of the external connecting terminal is exposed. The insulating film is an uppermost layer of the laminated structure formed on the substrate, and may be formed so as to keep away from the opening. In the electro-optical device, when the counter substrate is bonded to the TFT substrate from the top side of the insulating film, the conductive portion provided in the counter substrate comes into contact with the surface of the external connecting terminal of the TFT substrate, and the TFT substrate and the counter substrate can be electrically connected to each other.

Since the opening has an edge in which a portion extending in the rubbing direction is reduced when the alignment film formed on the insulating film is subjected to the rubbing process, it is possible to prevent the fabric disorder from occurring in the cloth material of the rubbing roller in the rubbing direction. In particularly, it is possible to prevent the extreme difference in the fabric disorder of the cloth material of the rubbing roller using the portion of the edge extending in the rubbing direction as the boundary. Here, 'in the rubbing direction' means parallel to the rubbing direction or substantially parallel to the rubbing direction such that the direction where a portion of the edge extends is toward the rubbing direction. That is, the difference of the fabric disorder on the surface of the cloth material does not extremely vary on the surface of the cloth material, and the distribution of the fabric disorder of the cloth material slightly varies on the surface of the cloth material in the region of both sides of the boundary of the surface of the cloth material in the rubbing direction. Accordingly, it is possible to reduce the striped alignment irregularities from occurring on the alignment film when the fabric disorder of the cloth material extremely varies in the rubbing direction. In the electro-optical device according to the first aspect, it is possible to reduce the display defective such as a streak observed on the image display surface when the image is displayed, so that the display quality can be improved.

Preferably, the opening has a circular shape.

According to this aspect, even when the rubbing direction is in any direction of the surface of the insulating film, the portion of the edge extending in the rubbing direction is reduced, so that it is possible to reduce the fabric disorder of the cloth material caused by the edge extending in the rubbing direction. Accordingly, it is possible to prevent the striped alignment irregularities from occurring on the alignment film, and the control for the process of removing the insulating film when the opening is formed can be easily performed as compared with a case in which the opening is formed having an edge that does not extend in a direction parallel to the rubbing direction. Therefore, the opening can be easily formed. Here, 'the opening shape' means a shape surrounded with the edge on the same surface as the surface of the insulating film. According to this aspect, the striped alignment irregularities occurring on the alignment film can be reduced while the TFT substrate and the counter substrate are electrically connected to each other through the terminal, which results in the improvement of the display quality.

Preferably, the opening has an elliptical shape that has a major axis in the rubbing direction.

According to this aspect, the difference of the fabric disorder of the cloth material in the rubbing direction is prevented from extremely increasing in each region of the surface of the alignment film. In addition, even when the plurality of openings are formed in the direction perpendicular to the rubbing direction, that is, a minor axis direction of the opening at a small pitch, it is prevented that the fabric disorder of the cloth material rapidly varies at the boundary in the rubbing direction.

Preferably, the opening has an elliptical shape that has a major axis at an angle inclined from the rubbing direction.

According to this aspect, the line segment component at the edge of the opening in the rubbing direction can be reduced, so that it is possible to effectively prevent the difference of the fabric disorder of the cloth material from extremely increasing in each region of the surface of the alignment film.

Preferably, the opening has a plurality of auxiliary openings that are connected to each other in the rubbing direction.

According to this aspect, the plurality of auxiliary openings come into contact with the probe composed of the conductive member, so that the electrical characteristic of the electro-optical device can be easily tested. In particular, since the plurality of auxiliary openings, which are connected to each other in the rubbing direction, are shifted in the rubbing direction, even when the openings are formed along the direction perpendicular to the rubbing direction at a small pitch, the electric characteristic of the electro-optical device can be tested in a state in which the probe is shifted in the rubbing direction.

Preferably, the auxiliary opening has a circular shape.

According to this aspect, even when the auxiliary opening is subjected to the rubbing process from any direction, the fabric disorder does not occur in the rubbing cloth in the rubbing direction. Accordingly, the electric characteristic of the electro-optical device can be easily performed, so that the reliability can be ensured, thereby providing an electro-optical device which has high performance and an excellent display quality.

Preferably, the edge has a portion that extends in a sinuated shape along the rubbing direction.

According to this aspect, since the edge has a sinuated portion which extends in a sinuated shape in the rubbing direction, the fabric disorder of the rubbing cloth can be reduced from occurring in the rubbing direction, and the alignment irregularities of the alignment film caused by the fabric disorder of the rubbing cloth can be reduced.

Preferably, a portion of the edge that extends in a direction perpendicular to the rubbing direction has a curved shape.

According to this aspect, it is possible to reduce the fabric disorder of the rubbing cloth from occurring due to the edge extending along the direction perpendicular to the rubbing direction. Accordingly, it is possible to reduce the fabric disorder of the rubbing cloth from occurring in the rubbing direction and the direction perpendicular to the rubbing direction. The display quality can be markedly improved as compared with the case of reducing only the fabric disorder of the rubbing cloth occurring in the rubbing direction.

Preferably, the edge has a portion that linearly extends in a direction inclined to the rubbing direction, and the opening has a shape that is surrounded with the portion which linearly extends.

According to this aspect, since the edge has a portion that linearly extends in a direction inclined to the rubbing direction, the opening can be made to have a rectangular shape such as a rhombus shape. Here, since each side of the rectangle such as the rhombus is inclined to the rubbing direction, it is possible to reduce the fabric disorder of the rubbing cloth occurring on the alignment film in the rubbing direction through the rubbing process. The shape, which is surrounded with the portion of the edge extending linearly, is not limited to the rectangular shape, but may be other polygonal shapes.

According to a second aspect of the invention, there is provided a method of manufacturing an electro-optical device, the method including: forming an external connecting terminal on a substrate; forming an insulating film on the external connecting terminal; and forming an opening by removing a portion of the insulating film such that a portion of a surface of the external connecting terminal is exposed, the opening having an edge formed such that a portion extending in a rubbing direction has a curved shape when an alignment film formed on the insulating film is subjected to a rubbing process.

According to this aspect, in the same manner as the electro-optical device according to the first aspect, it is possible to reduce the display defective such as a streak observed when the image is displayed. Accordingly, the display quality of the electro-optical device can be improved.

Preferably, the method of manufacturing an electro-optical device further includes: forming the alignment film on the insulating film; and subjecting the alignment film to a rubbing process by progressing a rubbing roller in a direction inclined to the direction where the edge extends.

According to this aspect, the direction where the edge extends and the rubbing direction are controlled, so that it is possible to relatively reduce the fabric disorder of the rubbing cloth occurring in the rubbing direction. Accordingly, the direction where the edge extends and the rubbing direction are adjusted, so that the fabric disorder of the rubbing cloth can be effectively reduced and the image quality can be improved.

Preferably, during the forming of the opening, the opening is formed such that the opening has any one of a circular shape, an elliptical shape that has a major axis in the rubbing direction, an elliptical shape that has a major axis at an angle inclined from the rubbing direction, a shape having sinuated portion, and a shape in which a plurality of circular shapes are connected to each other.

According to this aspect, it is possible to effectively reduce the fabric disorder of the cloth material in the same manner as the electro-optical device.

According to a third aspect of the invention, there is provided an electronic apparatus including the electro-optical device.

The electronic apparatus according to the third aspect has the above-mentioned electro-optical device, and can achieve high definition display in various electronic apparatuses including a projection-type display device, a liquid crystal television, a cellular phone, an electronic note, a word processor, a view-finder-type or a monitor-direct-view-type video tape recorder, a work station, a video phone, a POS terminal, an apparatus having a touch panel, and so forth. The electronic apparatus according to the invention can achieve a display device using an electron emission element (field emission display and surface-conduction electron-emitter display), a DLP (digital light processing) or the like.

The other effects and advantages of the invention can be apparent from the following embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an electro-optical device, a method of manufacturing the electro-optical device, and an electronic apparatus according to an embodiment of the invention will be described with reference to the accompanying drawings. In addition, in the present embodiment, a liquid crystal device is exemplified as the electro-optical device of the invention.

Overall Structure of Liquid Crystal Device

Figure 1:
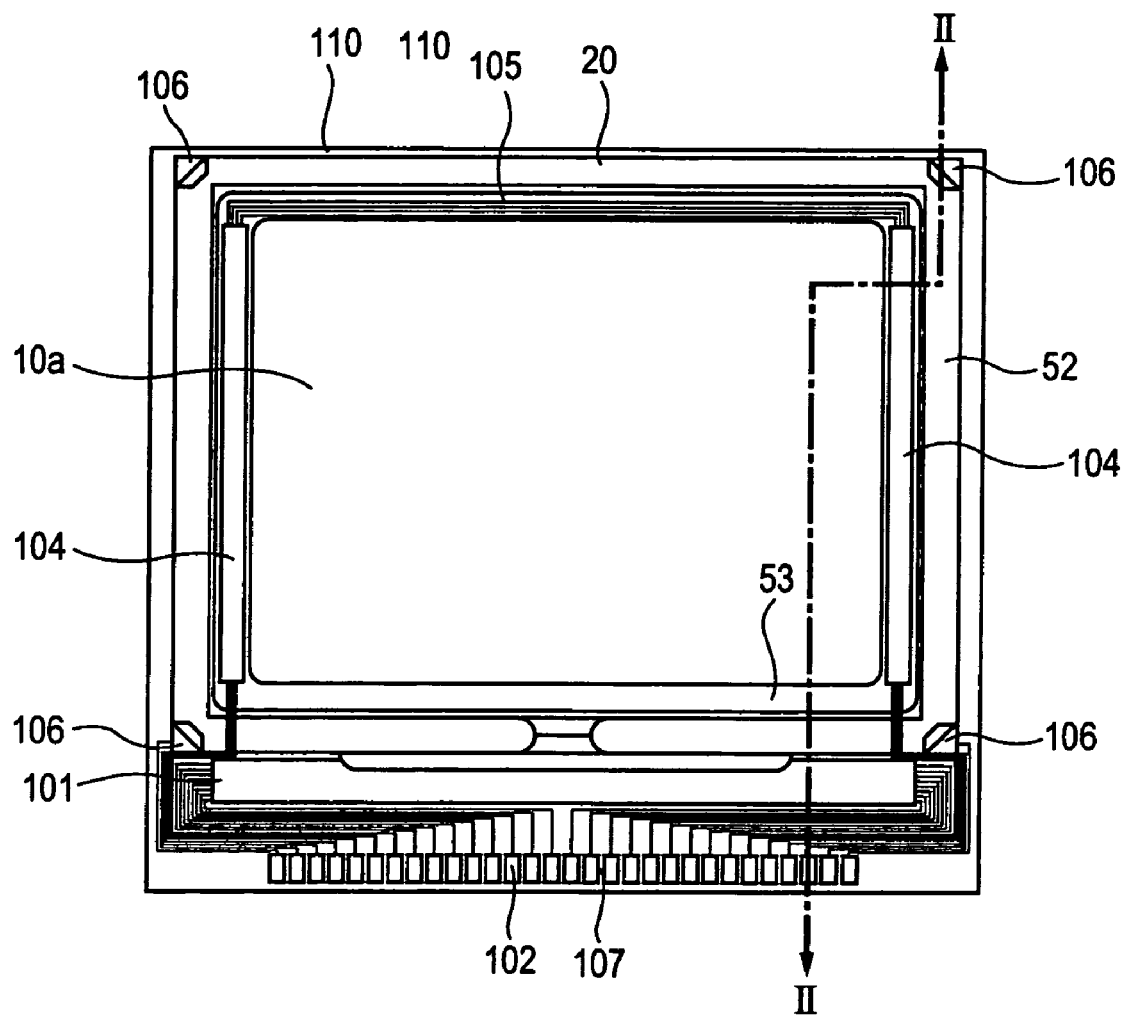
FIG. 1 is a plan view of a liquid crystal device 80 according to an embodiment of the invention.
Figure 2:
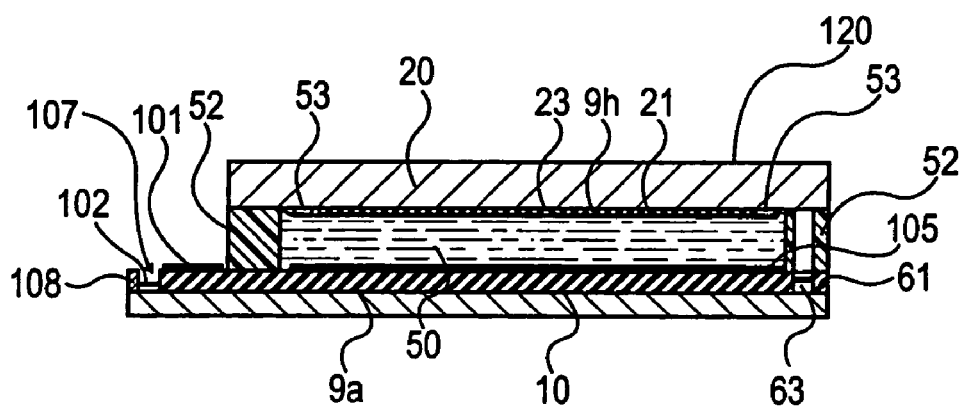
FIG. 2 is a cross-sectional view taken along the line II-II of FIG. 1.

First, a structure of a liquid crystal device 80 according to the present embodiment will be described with reference to FIGS. 1 and 2. FIG. 1 is a plan view of the liquid crystal device 80 when viewed from a counter substrate 120 disposed on a TFT array substrate 110. FIG. 2 is a cross-sectional view taken along the line II-II of FIG. 1.

In FIGS. 1 and 2, the liquid crystal device 80 includes a TFT array substrate 110 and a counter substrate 120 which is disposed opposite to the TFT array substrate 110. A liquid crystal layer 50 is sealed between the TFT array substrate 110 and the counter substrate 120. The TFT array substrate 110 and the counter substrate 120 are bonded to each other by a sealant 52, which is provided in a sealing region located around an image display region 10a.

The sealant 52 is made of, for example, an ultraviolet curable resin, a thermosetting resin or the like in order to bond the TFT array substrate and the counter substrate to each other. That is, the sealant 52 may be formed by applying the resin on the TFT array substrate 110 and hardening it through ultraviolet irradiation or heating during a manufacturing process. In the sealant 52, a gap material, such as glass fiber or glass beads, is dispersed so as to maintain a gap between the TFT array substrate 110 and the counter substrate 120 (gap between substrates) at a predetermined distance. For example, the liquid crystal device 80 according to the present embodiment may be used as a small-sized light valve of a projector when magnified display is performed, may be used as an image display device, or may be used as an image display unit for each of various electronic apparatuses.

Vertical conductive members 106 each of which serves as a vertical conductive terminal between the TFT substrate 110 and the counter substrate 120 are provided at four corners of the counter substrate 120. The counter substrate 120 has a frame light-shielding film 53 which is provided in parallel to the inside of the sealing region where the sealant 52 is disposed. The frame light-shielding film 53 defines a frame region of the image display region 10a. However, some of or entire of the frame light-shielding film 53 may be provided in the TFT array substrate 110 as a built light-shielding film.

The TFT substrate 110 has an insulating film 61 formed on a flat base 10 which is an example of 'a substrate' according to the embodiment of the invention, an opening 63 formed by removing a portion of the insulating film 61, a vertical conductive terminal 60 in which at least a portion of a surface is exposed to the opening 63, and an alignment film 9a formed in the image display region 10a on the insulating film 61. The vertical conductive terminal 60 is an example of 'a terminal' according to the embodiment of the invention, and is formed of a conductive material, such as aluminum or the like. When the TFT substrate 110 and the counter substrate 120 are bonded to each other, the vertical conductive member 106 comes into contact with the vertical conductive terminal 60, so that the TFT array substrate 110 and the counter substrate 120 are electrically connected to each other.

The TFT substrate 110 has a data line driving circuit 101 and an external circuit connecting terminal 102 which is an example of 'a terminal' according to the embodiment of the invention, which are provided on a region located outside a sealing region where the sealant 52 is disposed in a peripheral region located around the image display region 10a. The data line driving circuit 101 and the external circuit connecting terminal 102 are provided along one side of the TFT array substrate 110. At least a portion of the surface of the external circuit connecting terminal 102 is exposed to the opening 107 that is formed by removing some of the insulating film 61.

In FIG. 1, the TFT array substrate 110 has scanning line driving circuits 104 which are provided so as to be covered with the frame light-shielding film 53 at a region of the TFT array substrate 110 extending in a vertical direction with the image display region 10a interposed therebetween. In FIG. 1, a plurality of wiring lines 105 are provided such that they are covered with the frame light-shielding film 53 along one side of the TFT array substrate 110 extending in the horizontal direction in order to connect the two scanning line driving circuits 104 respectively provided in the right and left regions of the image display region 10a.

In FIG. 2, the alignment film 9a is formed such that the alignment film covers the pixel electrodes provided on a multilayered structure after the multilayered structure including a pixel switching TFT or wiring lines such as scanning lines or data lines (not shown) is provided on a base 10. The vertical conductive terminal 60 is electrically connected to the pixel switching TFT or the wiring lines such as the scanning line and the data line that constitute the multilayered structure. Further, on the counter substrate 120, a lattice-shaped or stripe-shaped light-shielding film 23 is formed, in addition to the counter electrode 21. Furthermore, an alignment film 9h is formed on the surface of the counter substrate 120 contacting with the liquid crystal layer 50. The liquid crystal layer 50 is made of liquid crystal obtained by mixing nematic liquid crystal of one kind or more with each other. The liquid crystal layer 50 maintains a predetermined alignment state between the alignment films 9a and 9h respectively formed on the TFT substrate 110 and the counter substrate 120.

Moreover, on the base 10 shown in FIGS. 1 and 2, in addition to the data line driving circuit 101 and the scanning line driving circuits 104, a sampling circuit, a precharge circuit, and a test circuit may be formed. Here, the sampling circuit samples an image signal on the image signal line to supply it to the data line. The precharge circuit supplies a precharge signal having a predetermined voltage level to the plurality of data lines prior to the image signal. The test circuit tests a quality such as an electrical characteristic of the liquid crystal device 80 or a defective during the manufacturing process or at the time of shipment.

Consideration About Reason Why Alignment Irregularities Occur

Figure 3:
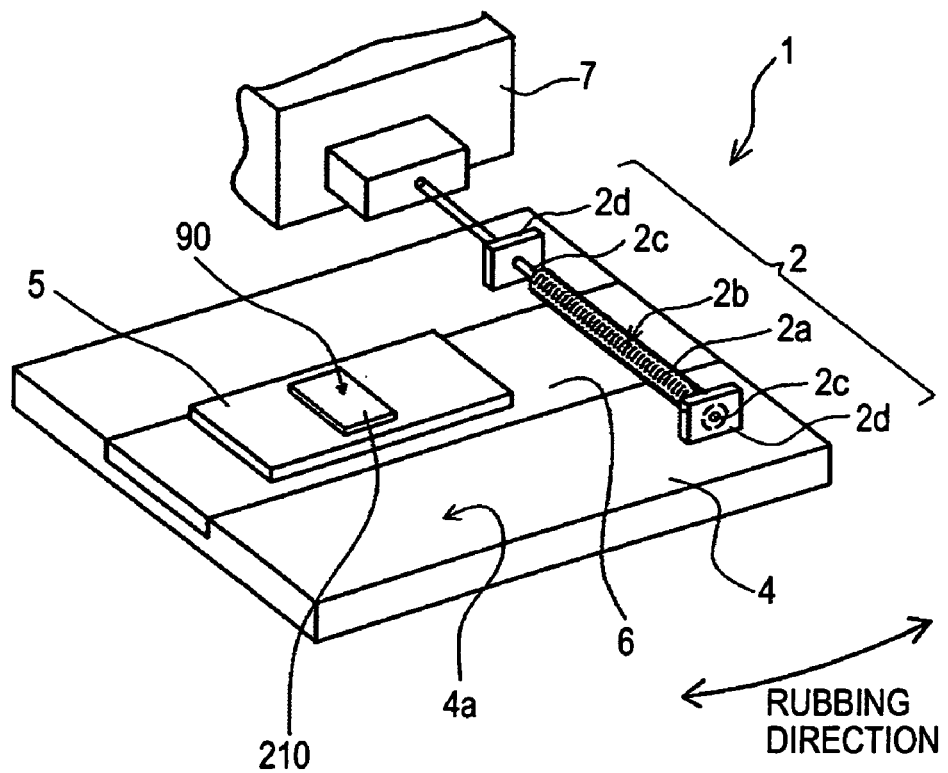
FIG. 3 is a perspective view illustrating a structure of essential elements of a rubbing device.
Figure 4:
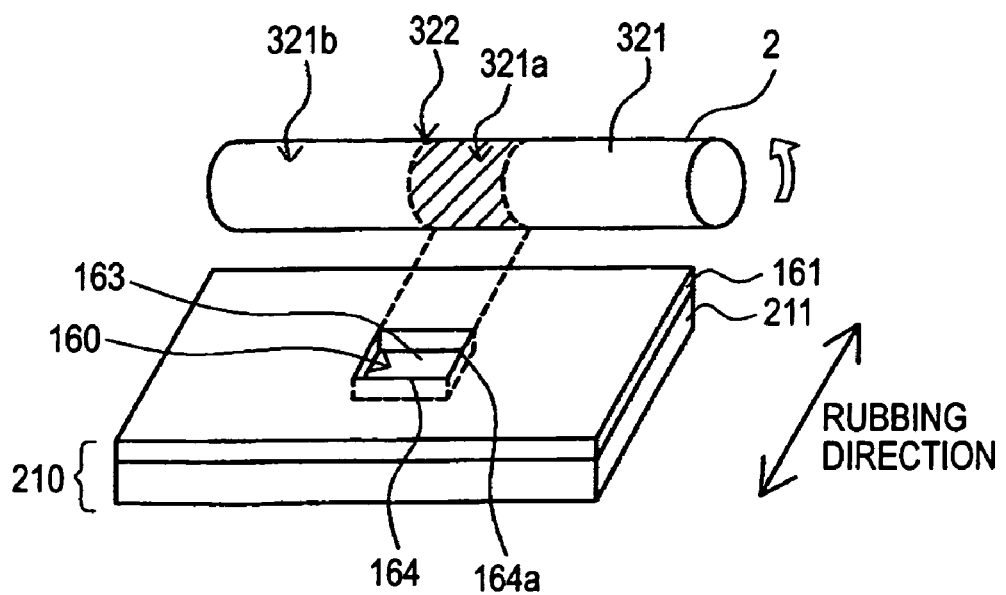
FIG. 4 is a perspective view schematically illustrating a positional relationship between an opening 160 provided in a TFT substrate 210 and a rubbing roller 2.
Figure 5:
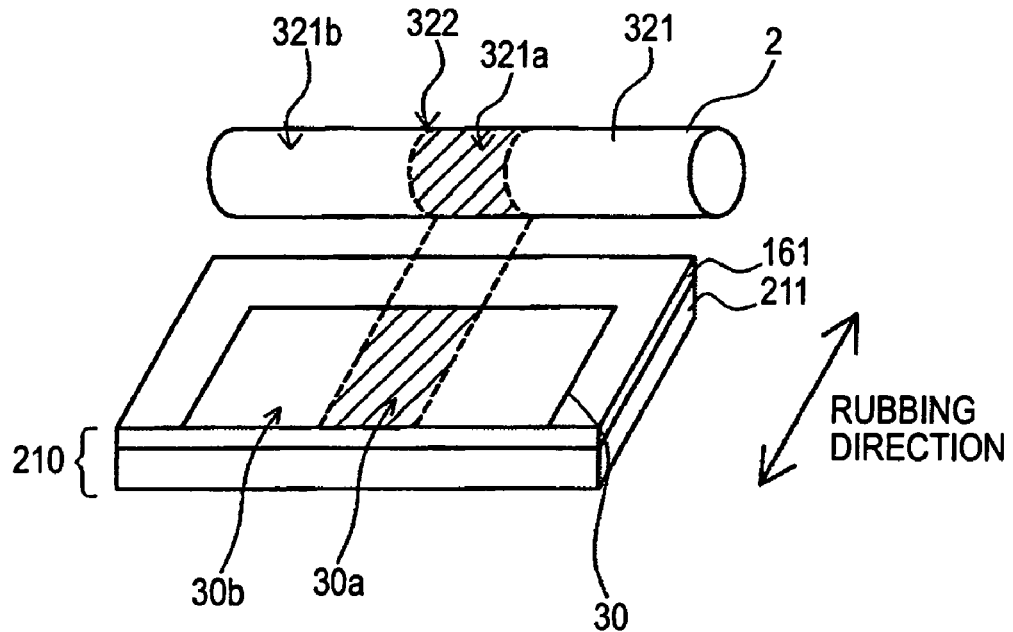
FIG. 5 is a perspective view schematically illustrating a positional relationship between alignment irregularities occurring on an alignment film 90 of the TFT substrate 210 and the rubbing roller 2.

Next, the reason why alignment irregularities occur which the inventor has considered, and a detailed structure of the TFT substrate 110 included in the liquid crystal device 80 will be described with reference to FIGS. 3 to 5. FIG. 3 is a perspective view illustrating a structure of essential elements of a rubbing device that performs a rubbing process on the alignment film 90 formed on the TFT substrate 210 in the image display region. FIGS. 4 and 5 are diagrams illustrating the reason why alignment irregularities occur, and FIG. 4 is a perspective view schematically illustrating the positional relationship between an opening 160 provided in the TFT substrate 210 and the rubbing roller 2. FIG. 5 is a perspective view schematically illustrating the positional relationship between alignment irregularities occurring on the alignment film 90 of the TFT array substrate 210 and the rubbing roller 2. Further, the TFT array substrate 210 has the same structure as the TFT array substrate 110, except for the shape of the opening, which will be described in detail below.

In FIG. 3, the rubbing device 1 mainly includes a rubbing roller 2 that is fixed on a top surface 4a of the base 4 (hereinafter, referred to as reference plane), a pallet 5 that mounts the TFT substrate 210 thereon at the time of a rubbing process and moves on the reference plane 4a, a guide 6 that guides the pallet 5 on the reference plane 4a such that the alignment film 90 of the TFT array substrate 210 mounted on the pallet 5 comes into contact with a peripheral surface 2b of the rubbing roller 2, and a motor 7 that supplies a rotational driving force to a rotation shaft 2c of the rubbing roller 2.

The rubbing roller 2 is rotatably pivoted on a plane parallel to the reference plane by a roller portion 2a having a roller peripheral surface 2b formed of a cloth material, the rotation shaft 2c, and a pair of roller bearings 2d. The pair of roller bearings 2d have height adjusting mechanisms (not shown) with respect to the reference plane 4a so as to arbitrarily adjust the height of the roller 2.

The rubbing roller 2 is supplied with a rotation force from the motor 7 through the rotation shaft 2c supported by the roller bearing 2d. The peripheral surface 2b of the roller portion 2a comes into contact with the alignment film 90 formed on the surface of the TFT substrate 210 while rotating at a speed of 300 rpm in one direction, so that a minute groove is formed on the surface of the alignment film 90 of the TFT substrate 210. As a result, the alignment film 90 becomes an alignment film having anisotropy.

At the time of the rubbing process, the pallet 5 moves on the reference plane 4a by the guide 6 in a state in which the TFT substrate 210 is mounted on the pallet 5, so that the TFT substrate 210 mounted on the pallet 5 comes into contact with the rubbing roller 2. Moreover, the guide 6 has a pallet angle adjusting mechanism (not shown), and the pallet angle adjusting mechanism varies the contacting angle of the TFT substrate 9 with respect to the rubbing roller or fixes it at the time of the rubbing process. Accordingly, when the rubbing process is executed, it is possible to set the rubbing direction to the inclined direction with respect to a direction where the edge of the opening extends.

In FIG. 4, the opening 160, which is formed in a portion of the insulating film 61 included in the TFT substrate 210, includes an edge 64 which has a linear portion 164a extending in the rubbing direction. Moreover, the opening 164 is provided in the peripheral region of the alignment film 90 formed on the insulating film 161 in the image display region.

When the alignment film 90 is subjected to the rubbing process, in a case in which the rubbing roller 2 rotates in a state in which it comes into contact with the surface of the insulating film 161, an extreme difference may be generated in the distribution of fabric disorder occurring on the surface 321 of the cloth material of the rubbing roller 2. In more detail, the extreme difference of fabric disorder of the cloth material may be generated in a region 321a of the surface 321 of the rubbing roller 2 passing above the opening 160 using a boundary portion 322 formed along the linear portion 164a as a boundary, and a region 321b passing the surface of the insulating film 161. One of the reasons why the difference of the fabric disorder is generated in the regions 321a and 321b is due to the difference of the stress which the rubbing roller 2 receives from the insulating film 161. In more detail, when the rubbing roller 2 rotatably moves on the insulating film 161 while pressing on the insulating film 161, the entire region 321b is applied with strong stress from the surface of the insulating film 161. In contrast, the stress applied to the region 321a is weaker than the stress applied to the region 321b because it passes above the opening 160. Accordingly, it is assumed that the extreme difference in the fabric disorder is generated on the surface 321 of the rubbing roller 2 at both sides of the boundary portion 322 formed along the linear portion 164a because of the difference of the stress received from the surface of the insulating film 161.

In FIG. 5, when the alignment film 30 is rubbed in a state in which the extreme difference in the fabric disorder is generated between the regions 321a and 321b, the extreme difference in alignment of the alignment film 30 may be generated in a region 30a of the alignment film 30 contacting with the region 321a and a region 30b of the alignment film 30 contacting with the region 321b, and alignment irregularities may occur on the alignment film 30 in accordance with the rubbing direction. Accordingly, it is assumed that reducing the linear portion 164a, which is a portion of the edge 164 of the opening 160 extending in a rubbing direction, is important in order to reduce the alignment irregularities of the alignment film.

Structure of TFT Substrate

Shapes of openings 63 and 107 provided in the TFT array substrate 110 will be described with reference to FIGS. 6 to 12 in consideration of the reason why the above-mentioned alignment irregularities occur.

Figure 6:
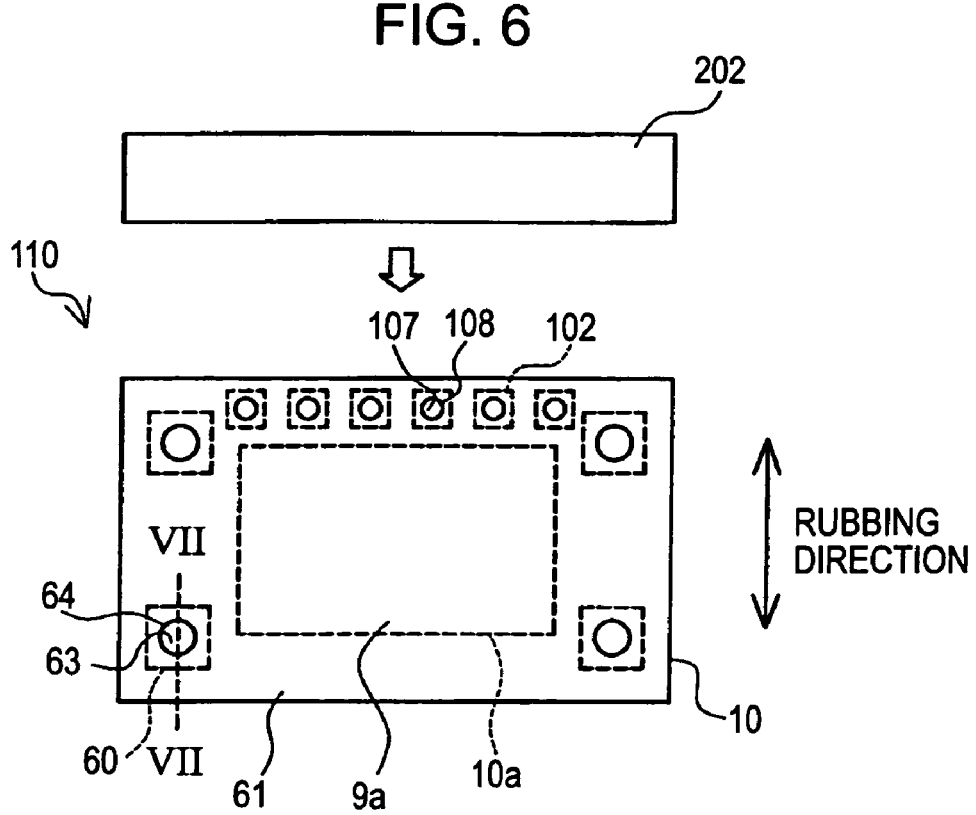
FIG. 6 is a plan view illustrating a structure of the TFT substrate 110.

FIG. 6 is a plan view illustrating a structure of the TFT substrate 110. In FIG. 6, the TFT substrate 110 includes an insulating film 61 formed on the uppermost layer of the base 10 including elements such as TFTs, a conductive layer, and an interlayer insulating film, and the openings 63 and 107 formed by removing portions of the insulating film 61. Vertical conductive terminals 60 and 102, which are formed at the lower layer side of the insulating film 61, are respectively exposed to opening regions of the opening 63 and 107. The vertical conductive terminals 60 and 102 are electrically connected to the TFT or conductive layer included in the TFT substrate 110 in a direct manner or indirect manner. The openings 63 and 107 are formed by removing portions of the insulating film 61 such that at least portions of the surfaces of the vertical conductive terminals 60 and 102 are exposed to the insulating film 61 after the vertical conductive terminals 60 and 102 are formed on the base 10.

The vertical conductive terminals 60 and 102, which are respectively exposed to the openings 63 and 107, may have planar shapes so long as portions of the surfaces of the vertical conductive terminals are exposed to the openings 63 and 107. In the present embodiment, the planar shapes of the vertical conductive terminals 60 and 102 are rectangular shapes, but may be other shapes. Portions or all of the vertical conductive terminals 60 and 102 may extend in-a required direction within the surface of the base 10.

The shapes of the openings 63 and 107 are circular. Accordingly, in the respective edges 64 and 108 of the openings 63 and 107, portions extending in the rubbing direction in the drawing, that is, portions extending in parallel to the rubbing direction or substantially in parallel to the rubbing direction are reduced. In particular, portions of the edges 64 and 108 extending in the rubbing direction are reduced as compared with the rectangular opening having the edge extending in the rubbing direction. In addition, since the opening shapes of the openings 63 and 107 are circular, even when the alignment film 9a is subjected to the rubbing process from any direction within the surface of the alignment film 9a, the edges 64 and 108 extends in a direction inclined to the rubbing direction.

According to these edges 64 and 108, when the alignment film 9a is subjected to the rubbing process, it is possible to effectively prevent the extreme difference of the fabric disorder from being generated at both sides of the boundary using, as the boundary, portions of the rubbing roller contacting with the edges 64 and 108 on the surface of the rubbing roller 202 contacting with the edges 64 and 108. In particular, a gradation is generated in the fabric disorder of the cloth material using portions of the surface of the rubbing roller 202 contacting with the edges 64 and 108 as a boundary. Accordingly, the region of the surface of the rubbing roller 202 where the extreme difference is generated in the fabric disorder comes into contact with the alignment film 9a, so that it is possible to prevent the striped alignment irregularities from occurring in the alignment film 9a. In addition, since the shape of the opening 63 is circular, when the opening is formed, the opening shape can be easily controlled, as compared with a case in which an opening having a linear edge is formed such that a portion provided in the rubbing direction is reduced. That is, the opening does not need to be formed while adjusting the inclination of the linear edge such that it extends in a direction inclined to the rubbing direction. Accordingly, the openings 63 and 107 having circular shapes are formed, so that the TFT substrate 110 and the counter substrate 120 are electrically connected to each other through the vertical conductive terminals 60 and 102. In addition, the striped alignment irregularities occurring on the alignment film 9a can be reduced, and the display quality of the liquid crystal device 80 can be improved.

Figure 7:
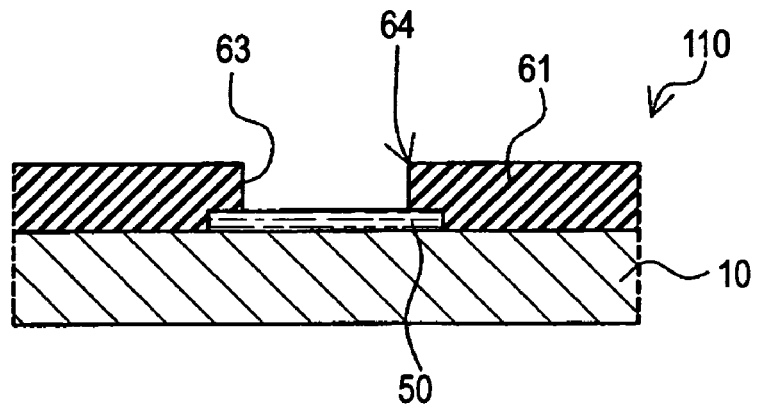
FIG. 7 is a cross-sectional view taken along the line VII-VII of FIG. 6.

FIG. 7 is a cross-sectional view taken along the line VII-VII of FIG. 6. In FIG. 7, a portion of the surface of the vertical conductive terminal 60 formed on the base 10 is exposed to the opening 63 formed by removing a portion of the insulating film 61. Since the opening 63 has the edge 64 in which a portion extending in the rubbing direction is reduced when the alignment film 9a formed on the insulating film 61 is subjected to the rubbing process, it is possible to reduce the extreme difference in the fabric disorder at both sides of the boundary portion extending in the rubbing direction in the cloth material.

As described above, according to the liquid crystal device 80 of the present embodiment, since alignment irregularities occurring in the rubbing direction can be reduced on the alignment film 9a, it is possible to reduce display defect such as a streak observed when the image is displayed, so that it is possible to improve the display quality of the liquid crystal device 80.

Next, modifications of a shape of an opening will be described with reference to FIGS. 8 to 11. The opening shown in each of the modifications is formed by removing a portion of the insulating film provided on the uppermost layer of the TFT substrate in the same manner as the above-mentioned opening, and a portion of the surface of the vertical conductive terminal formed on the lower layer of the insulating film is exposed to the opening.

First Modification

Figure 8:
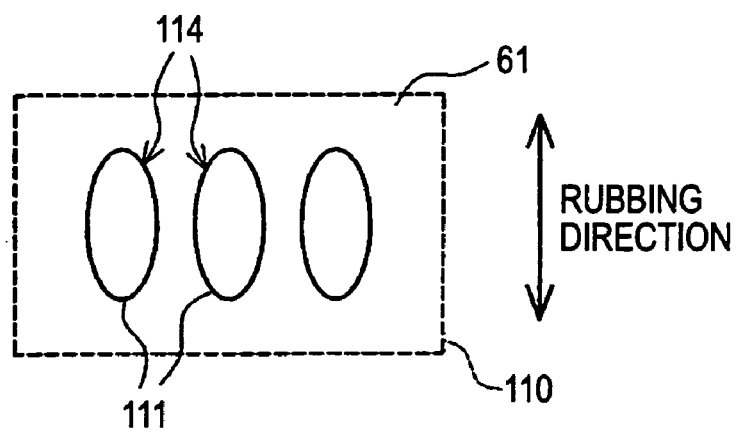
FIG. 8 is a plan view illustrating another example (first modification) of the opening according to the embodiment of the invention.

FIG. 8 is a plan view illustrating an example of the opening.

In FIG. 8, the opening Ill has an elliptical shape with a main axis in the rubbing direction. Since the opening 111 has an edge 114 in which a portion extending in the rubbing direction is reduced in the same manner as the openings 63 and 107, it is possible to prevent the extreme difference of the fiber disorder from being generated at both sides of a boundary using a portion of the surface of the rubbing roller contacting with the edge 114 as the boundary. Accordingly, it is possible to prevent a defect such as streak from being generated in the rubbing direction when the image is displayed in the same manner as the openings 63 and 107.

Figure 9:
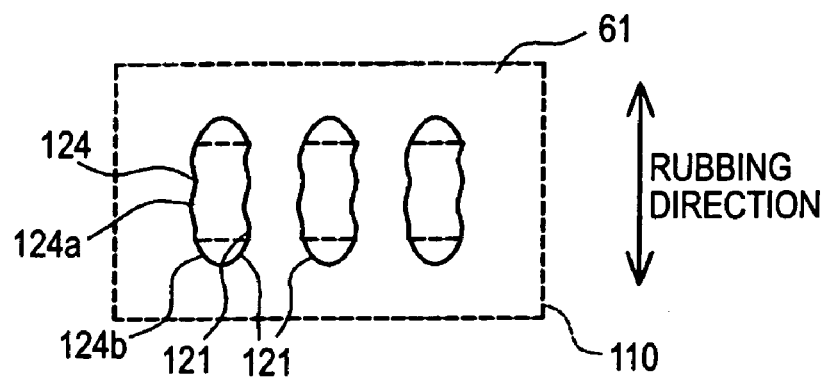
FIG. 9 is a plan view illustrating still another example (second modification) of the opening according to the embodiment of the invention.

As shown in FIG. 9, a plurality of openings 111 are formed in a direction perpendicular to the rubbing direction, that is, in a minor direction of the opening 111 with an elliptical shape. According to the opening 111, since a width of the opening 111 in a direction perpendicular to the rubbing direction is smaller than a length of the opening in the rubbing direction as compared with a case in which the shape of the opening is circular, the plurality of openings 111 can be formed in the rubbing direction at a small pitch. Accordingly, according to the opening 111 of the present modification, even when the openings 111 are formed in a direction perpendicular to the rubbing direction, that is, a minor direction of the opening 111 at a small pitch, it is possible to prevent the extreme difference from being generated in the fiber disorder of the rubbing roller.

Second Modification

FIG. 9 is a plan view illustrating another example of the opening.

In FIG. 9, in an opening 121, an edge 124 has a sinuated portion 124a which extends in a sinuated shape in the rubbing direction.

The sinuated portion 124a extends in the rubbing direction as a whole. However, when each of portions between one end and the other end is locally seen, each portion has a curved shape such that it extends in a direction inclined to the rubbing direction, and these portions are connected to each other, so that the sinuated portions 124a constitutes the edge 124 which is continuously formed. Accordingly, the portion of the edge 124 formed in the rubbing direction in the opening 121 is reduced. According to the opening 121, it is possible to prevent the extreme difference of the fiber disorder of the rubbing cloth from being generated in the rubbing direction, so that it is possible to prevent the alignment irregularities from being generated in the rubbing direction.

As shown in FIG. 9, it is preferable that the linear portion 124b of the edge 124 of the opening 121, which extends in a direction perpendicular to the rubbing direction, is inclined in a direction perpendicular to the rubbing direction. For example, preferably, it has a curved shape. According to the linear portion 124b, it is possible to reduce not only alignment irregularities occurring by the portion of the edge 124 extending in the rubbing direction but also alignment irregularities occurring by the portion of the edge 124 extending in a direction perpendicular to the rubbing direction. In addition, the alignment irregularities of the alignment film can be effectively reduced, and the display quality of the liquid crystal device can be effectively improved. Moreover, the edge 124 of the present modification may have a linear portion 124b with a straight shape as shown by a dotted line in the drawing.

Third Modification

Figure 10:
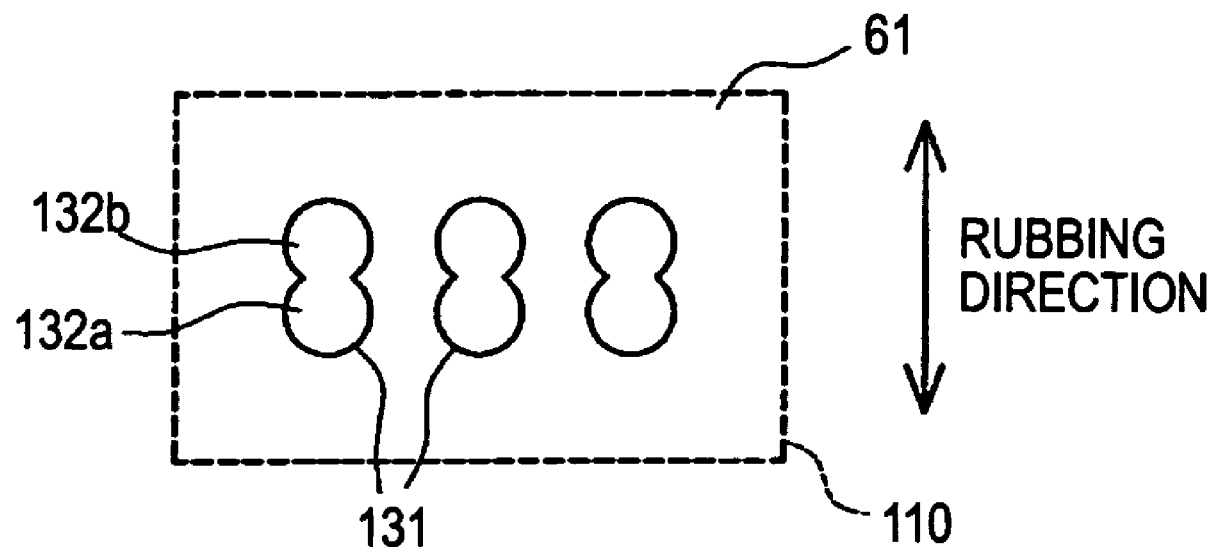
FIG. 10 is a plan view illustrating a further example (third modification) of the opening according to the embodiment of the invention.

FIG. 10 is a plan view illustrating still another example of the opening 131.

In FIG. 10, the opening 131 is composed of two auxiliary openings 132a and 132b, which are connected to each other in a rubbing direction.

Since each of the auxiliary openings 132a and 132b has a circular shape, even when the auxiliary opening 132 is subjected to the rubbing process from any direction within the surface of the insulating film, the edges 134a and 134b of the auxiliary openings 132a and 132b extend in a direction inclined to the rubbing direction. Accordingly, in the same manner as the above-mentioned modifications, the striped alignment irregularities occurring in the rubbing direction can be reduced. In addition, in the present modification, the two auxiliary openings 132a and 132b are connected to each other, but three auxiliary openings or more are connected to each other in the rubbing direction.

The two auxiliary openings 132a and 132b are effective when the electrical characteristic of the electro-optical device such as the liquid crystal device having this auxiliary opening 132 is tested. In particular, a probe, which is composed of a conductive member, comes into contact with the terminals which are exposed to the auxiliary openings 132a and 132b provided so as to be shifted from the rubbing direction, so that the electrical characteristic of the electro-optical device can be easily tested. That is, even when the openings 131 are formed in a direction perpendicular to the rubbing direction at a small pitch, the electrical characteristic of the electro-optical device can be tested in a state in which the probe is shifted from the rubbing direction, the electrical characteristic can be tested without making the probe come close to the terminal in accordance with the pitch of the opening 131. Accordingly, the testing probe comes closes to the terminal, so that the any missed test by making the probe coming into contact with the terminal can be reduced. Accordingly, it is possible to provide an electro-optical device having high performance in which the reliability can be ensured and the display quality can be improved.

Fourth Modification

Figure 11:
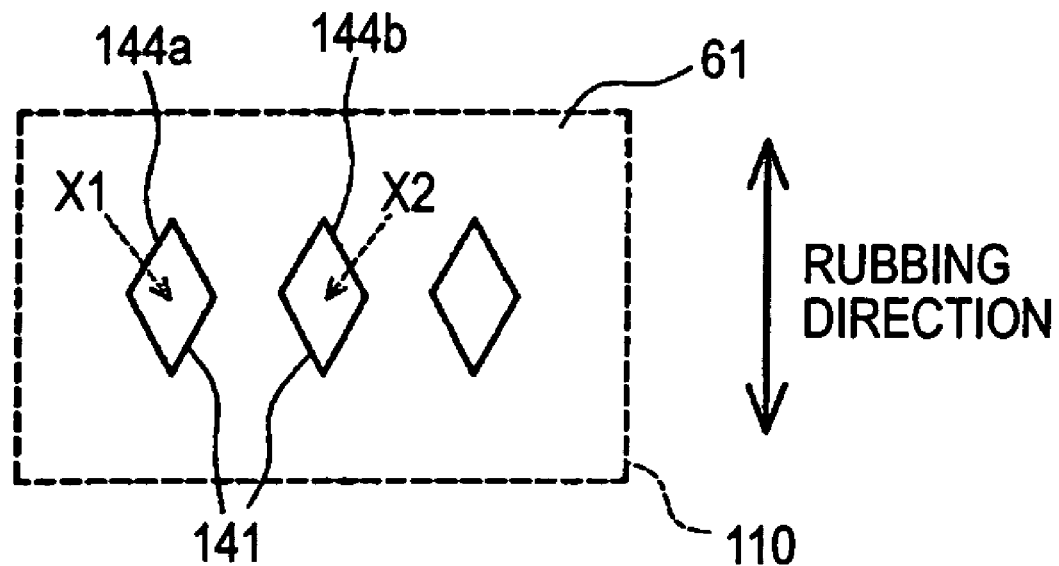
FIG. 11 is a plan view illustrating a further example (fourth modification) of the opening according to the embodiment of the invention.

FIG. 11 is a plan view illustrating a further example of the opening.

In FIG. 11, an edge 144 of an opening 141 has linear portions 144a and 144b which linearly extend in a direction inclined to the rubbing direction, and the opening 141 has an opening shape formed by connecting the linear portions 144a and 144b to each other. In the present modification, the opening 141 has a rhombus shape. Accordingly, it is possible to prevent the striped alignment irregularities from occurring in the rubbing direction in the same manner as the openings of the above-mentioned modifications.

If the alignment film is subjected to the rubbing process such that the rubbing direction is not set in the direction shown by each of arrows X1 and X2, even when the edge 144 has the linear portions 144a and 144b, the linear portions 144a and 144b, which are the respective sides of a rhombus, can reduce the alignment irregularities occurring in the rubbing direction.

Method of Manufacturing Liquid Crystal Device

Next, a method of manufacturing the liquid crystal device 80 will be described with reference to FIG. 12.

Figure 12A:
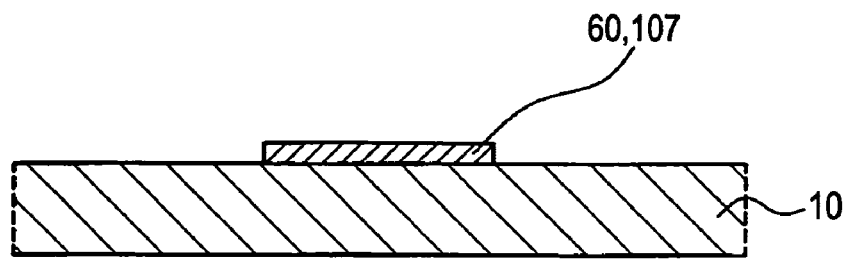
FIG. 12 is a cross-sectional view illustrating a process of manufacturing a liquid crystal device according to the embodiment of the invention.

In FIG. 12A, a vertical conductive terminal 60 or 102 is formed on a base 10. The vertical conductive terminal 60 or 102 extends on the surface of the base 10. The vertical conductive terminal 60 or 102 is formed by etching the conductive film, such that it has a required planer shape after the conductive film is formed on the surface of the base 10.

Figure 12B:
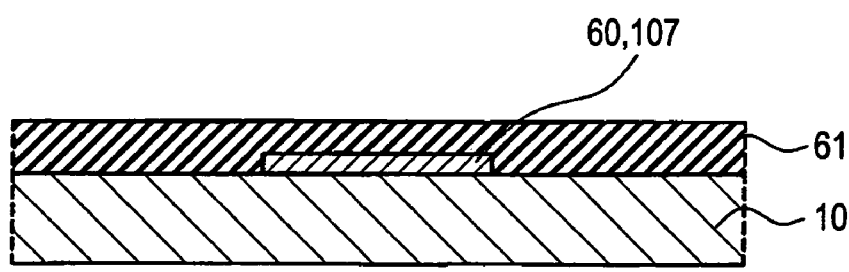

Next, in FIG. 12(b), an insulating film 61 is formed on the vertical conductive terminal 60 or 102. At this time, the surface of the insulating film 61 may be planarized.

Figure 12C:
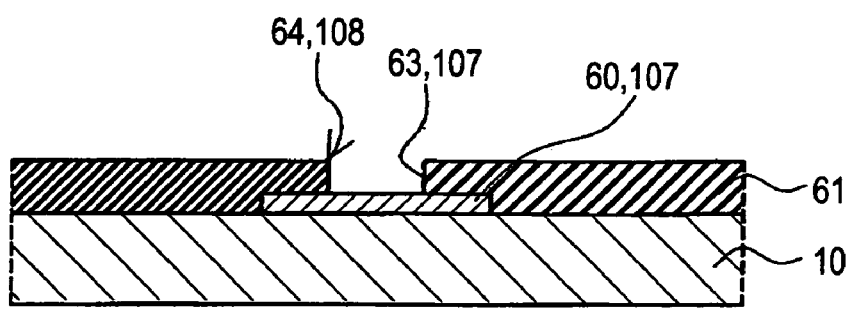
Figure 12D:
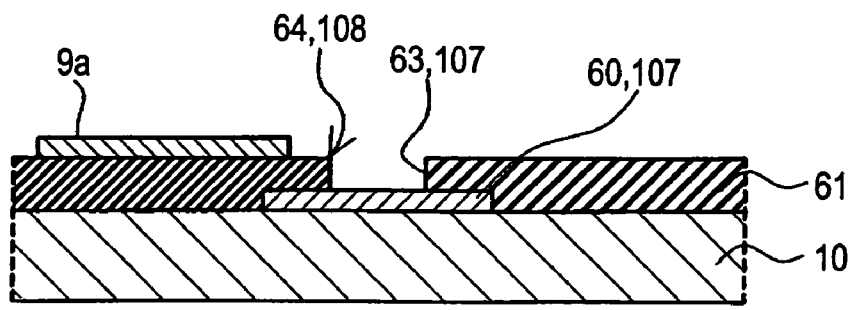

Next, in FIG. 12(c), a portion of the insulating film 61 is removed such that at least a portion of the surface of the vertical conductive terminal 60 or 102 is exposed, and an opening 63 or 107 is formed. At this time, an etching condition for removing the insulating film 61 is adjusted, so that opening 64 or 107 is formed such that it has an edge 64 or 108 in which a portion in the rubbing direction of the rubbing process with respect to the alignment film formed on the insulating film 61 is reduced in the following process.

Next, an alignment film 30 is formed on the insulating film 61 so as to keep away from the opening 63 or 107. Subsequently, the alignment film 30 is subjected to the rubbing process and the TFT array substrate 110 is formed. After that, the counter substrate 120 is bonded to the TFT substrate 110, liquid crystal is inserted between the substrates, and a liquid crystal device 80 is formed. Moreover, when the alignment film 30 is subjected to the rubbing process, the position of the TFT substrate 110 can be adjusted with respect to the progressing direction of the rubbing roller such that the edge 64 or 108 of the opening 63 or 107 extends in a relatively inclined direction with respect to the rubbing direction.

According to the method of manufacturing the liquid crystal device of the present embodiment, it is possible to reduce the display defective such as a streak observed when the image is displayed, so that it is possible to improve the display quality of the liquid crystal device.

Electronic Apparatus

Next, various electronic apparatus on which the above-mentioned liquid crystal device is mounted will be described with reference to FIGS. 13 and 14. Since the electronic apparatus according the present embodiment has the above-mentioned liquid crystal device, it has a superior display quality. In addition, the above-mentioned liquid crystal device is applied to an electronic apparatus having a large screen, so that it is possible to constitute a television monitor having a large image display surface. Further, the invention is not limited to the electronic apparatus having the large image display surface, but the above-mentioned electro-optical device substrate may be applied to various electronic apparatuses, which will be described in detail below.

Mobile Computer

An example in which the above-mentioned liquid crystal device is applied to a mobile-type personal computer will be described with reference to FIG. 13. FIG. 13 is a perspective view illustrating a structure of a computer 1200.

Figure 13:
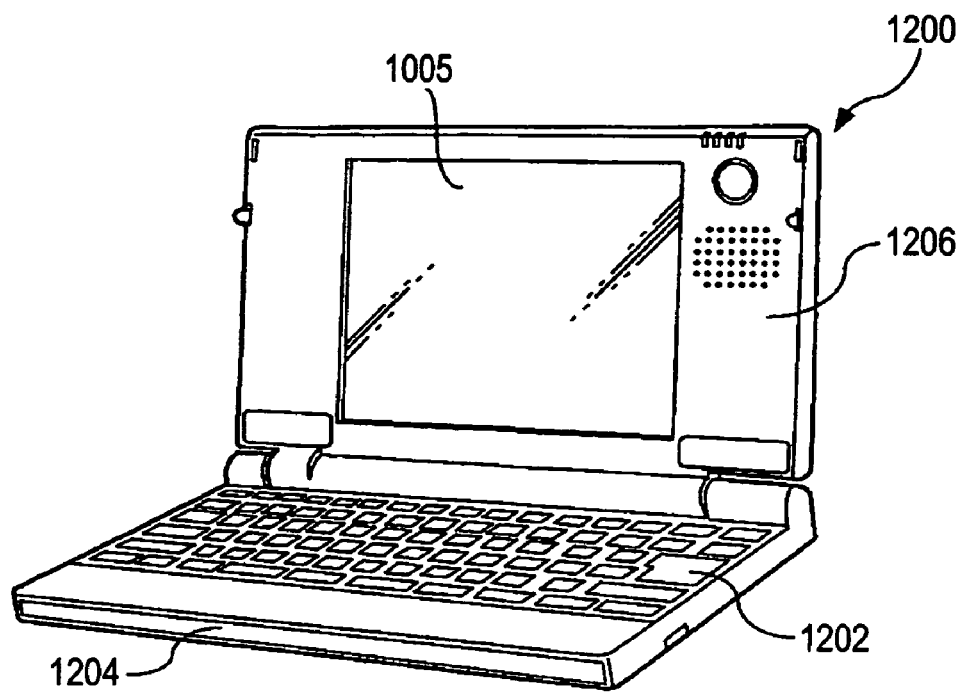
FIG. 13 is a perspective view illustrating an example of an electronic apparatus according to the embodiment of the invention.
Figure 14:
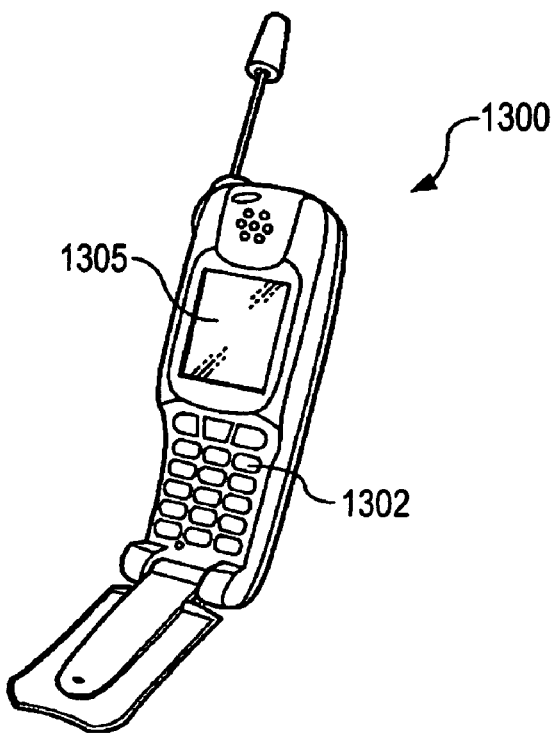
FIG. 14 is a perspective view illustrating another example of an electronic apparatus according to the embodiment of the invention.

In FIG. 13, the computer 1200 includes a main body unit 1204 having a keyboard 1202 and a display unit 1206 having a display portion 1005 that is constructed using a liquid crystal device (not shown). The display unit 1005 can display a high definition image because a disadvantage due to a streak-like image noise can be reduced when the image is displayed. In addition, color filters, which make light generated from a light source emitted from a pixel unit as light corresponding to three primary colors including red, green and blue, are provided in the liquid crystal device constituting the display unit 1005. As a result, the display unit 1005 can perform image display with full color display.

Cellular Phone

Further, an example in which the above-mentioned liquid crystal device is applied to a cellular phone will be described with reference to FIG. 14. FIG. 14 is a perspective view illustrating a structure of a cellular phone 1300. In FIG. 14, the cellular phone 1300 includes a plurality of operation buttons 1302 and a display unit 1305 having the liquid crystal device according to the embodiment of the invention.

A display portion 1305 has the above-mentioned liquid crystal device in the same manner as the display portion 1005 in the mobile computer. In the liquid crystal device, alignment irregularities are reduced. In addition, in the liquid crystal device included in the display portion 1305, since a test, such as an internal circuit or the like, is carried out, it can display a high definition image for a long time with high reliability. In particular, since it is important that the cellular phone 1300 can be used for a long time without failure, it is preferable that the liquid crystal device, which is an example of the electro-optical device according to the embodiment of the invention, be applied to the cellular phone 1300. Further, in the same manner as the above-mentioned mobile computer, the liquid crystal device included in the display portion 1305 has a pixel unit that can emit light corresponding to three primary colors including red, green, and blue, so that the display portion 1305 can perform image display with full color display. As such, in the electronic apparatus having a relatively small image display surface, the electro-optical device according to the embodiment of the invention can be used.

Further, the invention is not limited to the above-mentioned embodiment, but various changes and modification can be made without departing from the spirit and scope of the invention which can be read from the claims and the overall specification. An electro-optical device in which a change is made, a method of manufacturing the electro-optical device, and an electronic apparatus having the electro-optical device are within the technical range of the invention.

What is claimed is:

1. An electro-optical device comprising:
   a substrate;
   an external connecting terminal that is formed on the substrate;
   an insulating film that is formed on the external connecting terminal; and
   an alignment film over the insulating film, the alignment film being subjected to a rubbing process in a rubbing direction;
   the insulating film including an opening such that a portion of a surface of the external connecting terminal is exposed, the opening having an edge formed such that a portion extending in the rubbing direction has a curved shape.

2. The electro-optical device according to claim 1, wherein the opening has a circular shape.

3. The electro-optical device according to claim 1, wherein the opening has an elliptical shape that has a major axis in the rubbing direction.

4. The electro-optical device according to claim 1, wherein the opening has an elliptical shape that has a major axis at an angle inclined from the rubbing direction.

5. The electro-optical device according to claim 1, wherein the opening has a plurality of auxiliary openings that are connected to each other in the rubbing direction.

6. The electro-optical device according to claim 5, wherein the auxiliary opening has a circular shape.

7. The electro-optical device according to claim 1, wherein the edge has a portion that extends in a sinuated shape along the rubbing direction.

8. The electro-optical device according to claim 1, wherein a portion of the edge that extends in a direction perpendicular to the rubbing direction has a curved shape.

9. The electro-optical device according to claim 1, wherein the edge has portions that linearly extend in a direction inclined to the rubbing direction; and
   the opening has a shape that is surrounded with the portions which linearly extends.

10. A method of manufacturing an electro-optical device, the method comprising:
    forming an external connecting terminal on a substrate;
    forming an insulating film on the external connecting terminal;
    forming an alignment film over the insulating film, the alignment film being subjected to a rubbing process in a rubbing direction; and
    forming an opening by removing a portion of the insulating film such that a portion of a surface of the external connecting terminal is exposed, the opening having an edge formed such that a portion extending in a rubbing direction has a curved shape.

11. The method of manufacturing an electro-optical device according to claim 10, the method further comprising:
    forming the alignment film on the insulating film; and
    subjecting the alignment film to a rubbing process by progressing a rubbing roller in a direction inclined to the direction where the edge extends.

12. The method of manufacturing an electro-optical device according to claim 10,
    wherein during the forming of the opening, the opening is formed such that the opening has any one of a circular shape, an elliptical shape that has a major axis in the rubbing direction, an elliptical shape that has a major axis at an angle inclined from the rubbing direction, a shape having a sinuated portion, and a shape in which a plurality of circular shapes are connected to each other.

13. An electronic apparatus comprising the electro-optical device according to claim 1.

* * * * *